United States Patent [19]
Hollingsead et al.

[11] 3,771,023
[45] Nov. 6, 1973

[54] AVIONIC TRAY AND DETACHABLE METERING PLATE CONTROLLING AIR FLOW TO AN ELECTRONIC INSTRUMENT WITH COOLING METERING PLATE

[75] Inventors: Robert A. Hollingsead, Yorba Linda; Clyde Robert Pryor, Anaheim, both of Calif.

[73] Assignee: Hollingsead-Pryor Enterprises, Inc., Santa Fe Springs, Calif.

[22] Filed: Mar. 18, 1971

[21] Appl. No.: 125,561

[52] U.S. Cl............... 317/100, 174/153 G, 277/178
[51] Int. Cl. ............................................. H05k 7/20
[58] Field of Search...................... 174/65 G, 152 G, 174/153 G; 277/178, 208, 226; 317/101 R, 101 CB, 100, 120

[56] References Cited
UNITED STATES PATENTS

| | | | |
|---|---|---|---|
| 2,607,966 | 8/1952 | Beck | 49/486 |
| 2,077,686 | 4/1937 | Gober | 174/153 G |
| 3,016,254 | 1/1962 | Holdeman | 277/178 X |
| 3,082,470 | 3/1963 | Fork | 174/153 G |
| 3,550,987 | 12/1970 | Dickey | 277/226 X |
| 2,607,966 | 8/1952 | Beck | 277/226 X |
| 3,541,395 | 11/1970 | Lucchino | 317/100 |

FOREIGN PATENTS OR APPLICATIONS

| | | | |
|---|---|---|---|
| 1,083,382 | 6/1960 | Germany | 174/65 G |
| 214,210 | 8/1960 | Austria | 174/153 G |

Primary Examiner—Robert K. Schaefer
Assistant Examiner—Gerald P. Tolin
Attorney—Jackson & Jones

[57] ABSTRACT

An avionic tray is disclosed for supporting electronic instruments on a shelf. The tray includes an aperture formed thereon for providing the supported instrument with communication to an air plenum chamber. An interchangeable metering plate is adapted to extend over the aperture, with the plate having a predetermined number of metering ports formed thereon in any desired arrangement. The metering plate is interconnected to the aperture by means of a removable annular gasket, which in turn sealingly engages a surface of the electronic instrument. The gasket includes a pair of annular grooves for receiving the peripheral edges of the metering plate and the tray aperture. The gasket is constructed in such a manner that any application of a downward or lateral force on the gasket by the supported instrument causes the metering plate to be forced against the tim of the aperture to tightly hold the portion of the gasket between the two elements and prevent the gasket from becoming disengaged.

14 Claims, 2 Drawing Figures

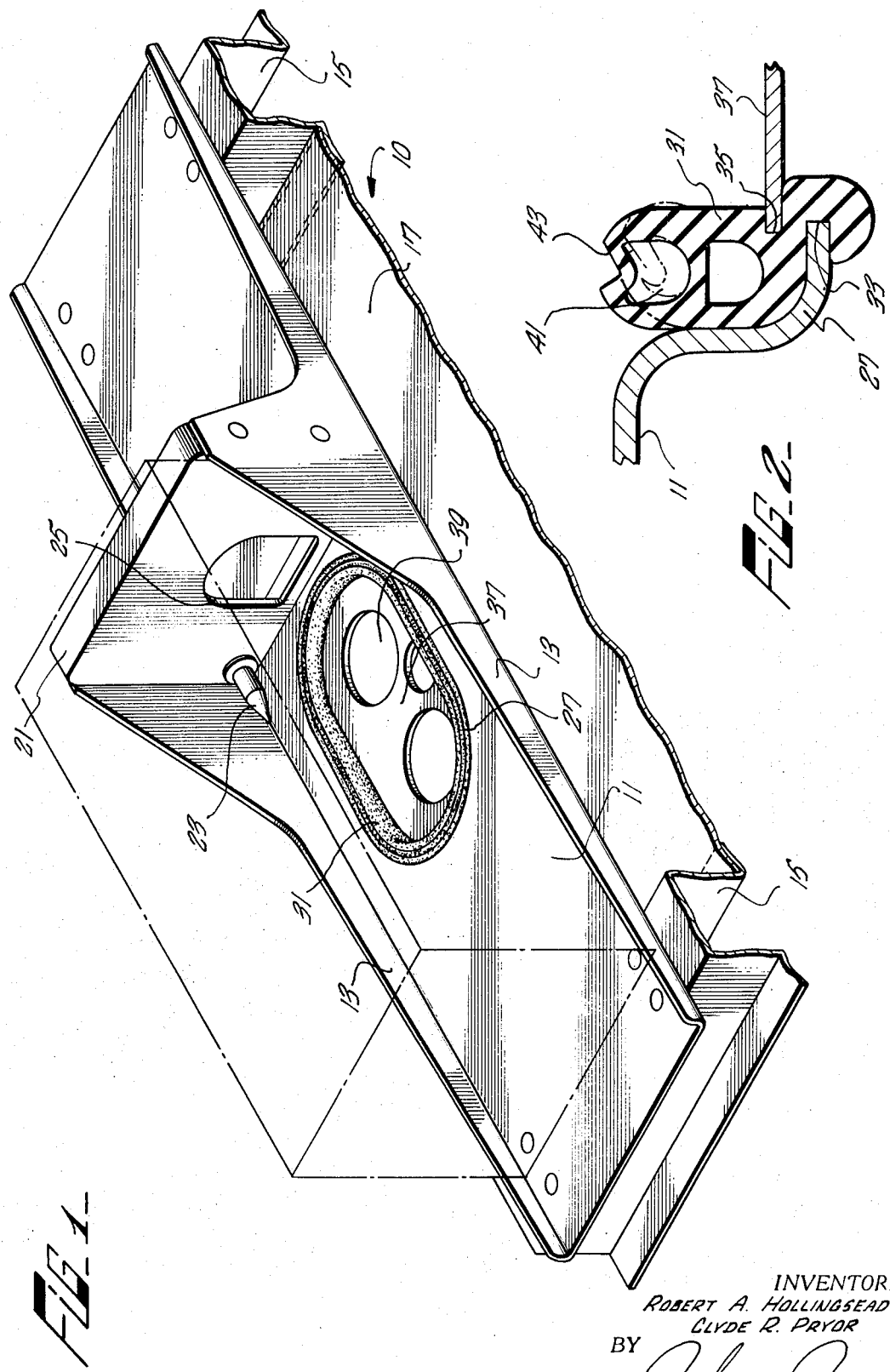

3,771,023

AVIONIC TRAY AND DETACHABLE METERING PLATE CONTROLLING AIR FLOW TO AN ELECTRONIC INSTRUMENT WITH COOLING METERING PLATE

BACKGROUND OF THE INVENTION

1. Field of the Invention

The present invention relates to avionic racking, and more particularly to the trays utilized in supporting the electronic instruments on shelves.

2. Description of the Prior Art

In an aircraft, each piece of electronic equipment is supported on an individual tray which, in turn, is supported at its front and back ends on a pair of cross beams. The trays are made in standard ATR widths to accommodate the various sizes of instruments. In a typical shelf, the plurality of trays are closely spaced on the cross beams to completely enclose the entire length of the shelf. A closure plate is positioned beneath the cross beams to completely enclose the area directly below the trays to form an air plenum chamber. The air plenum chamber of each shelf then communicates with a vertical manifold, located at the ends of the shelves, which in turn is connected to a vacuum system.

The outer casing of each instrument is provided with standard air vents at the top and bottom sides to permit cooling air to be drawn therethrough. Each tray includes a pocket formed below the main surface thereof, with the pocket having a plurality of metering ports defined therein to enable the supported instrument to communicate with the air plenum chamber. Finally, an annular gasket is bonded to the bottom surface of the pocket of each tray about the periphery of the aperture with the upper portion of the gasket extending out of the pocket above the main surface of the tray to sealingly engage the bottom of the instrument supported thereon. In this manner, air from beneath the instrument is prevented from leaking into the air plenum chamber. As a result, the only cooling air drawn into the system is vented through the instruments.

Although these trays have been used extensively in a great number of aircraft, they still suffer from various shortcomings which severely hamper their utilization.

A serious problem is encountered when the instrument is installed on the tray. During such installation, the back end of the instrument is placed on the tray and shoved rearwardly until it contacts the backplate on the tray. However, during such movement, the bottom edge of the instrument contacts the exposed portion of the gasket extending above the surface of the tray. Quite often, this engagement causes the gasket to be torn away from its bonded seat on the tray. When this occurs, the gasket becomes twisted and entangled within the pocket. This unseating of the gasket not only causes leakage into the air plenum chamber from the area beneath the supported instrument, but the entanglement also causes misalignment of the supported instrument with the tray backplate and the electrical connections mounted thereon.

Another shortcoming with the prior trays is that if it is desired to change the porting arrangement in the tray because of different cooling requirements, the entire tray has to be replaced with one having the desired porting arrangement. Not only is this inconvenient because an extra supply of trays which must be kept by the user, but the storing of extra trays also involves an even greater expense.

SUMMARY OF THE INVENTION

The present invention obviates the above-mentioned shortcomings by providing a tray having an improved gasket structure which is removably mounted on the tray and is constructed to ensure an air-tight seal between the tray and the instrument at all times. The tray comprises a bottom section and a pair of side rails extending upwardly along the lateral edges thereof. An annular rim is formed on the bottom section of the tray in a pocket extending below the bottom supporting surface of the tray. An interchangeable metering plate, having a predetermined number of metering ports formed thereon in any desired arrangement, is provided to extend over the annular rim of the tray. The metering plate is interconnected to the annular rim by means of a removable annular gasket. The annular gasket is connected to the tray by means of a lower groove formed about the outer periphery thereof which is adapted to receive the peripheral edge of the annular rim. The connection to the metering plate is accomplished with an upper groove formed about the inner periphery thereof which is adapted to receive the peripheral edge of the metering plate. The top portion of the gasket extends above the bottom supporting surface of the tray to sealingly engage the bottom surface of the supported instrument. The gasket is constructed in such a manner that any application of a downward or lateral force on the top portion of the gasket causes the metering plate to be forced downward against the annular rim of the tray to tightly hold that portion of the gasket between the two elements and prevent the gasket from becoming disengaged and entangled.

The interchangeable metering plate is provided with any amount of metering ports positioned in any desired arrangement to accommodate any cooling requirement.

The primary advantage of the present invention is that the improved gasket does not become disengaged with the annular rim of the tray upon installation of the instrument. In fact, the gasket actually becomes more tightly secured upon a lateral or downward force of the instrument.

Another advantage of the present invention is that the gasket is removable and can be inserted and removed from the tray without any special tools.

Another advantage of the present invention is that the interchangeable metering plates can be easily removed from the gasket retention to permit a wide range of porting arrangements to be utilized without the necessity of changing the entire tray.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the improved avionic tray in accordance with the present invention; and FIG. 2 is an enlarged sectional view of the gasket interconnecting the metering plate to the tray.

DESCRIPTION OF THE PREFERRED EMBODIMENT

Referring now to the drawings, FIG. 1 shows an avionic tray, generally indicated by arrow 10, for supporting an electronic instrument (shown in broken lines). The tray 10 comprises a bottom section 11 and a pair of side rails 13 extending upwardly along the lateral edges thereof. The bottom section 11 is adapted to be mounted at its ends to a pair of cross-channels 15 with the entire length of the channels 15 being covered with similar trays to form a shelf. A closure plate 17 is connected to the bottom of the cross-channels to completely enclose the space below the trays 10 to form an air plenum chamber. The air plenum chamber is connected to a manifold (not shown) at one end of the shelf in the conventional manner.

The side rails 13 function as a guide for the supported instrument and as a support for a backplate 21. The backplate 21 includes a pair of guide pins 23 for receiving the mating portion of the instrument and a cut-out portion 25 for receiving an electrical receptacle (not shown) which is adapted to receivingly engage the plug portion of the instrument.

An annular rim 27 is also formed in the bottom section 11 of the tray in a pocket extending below the supporting surface of the tray. A removable annular gasket 31 is provided to extend around the periphery of the rim 27. The gasket 31 is preferably formed from a length of extruded silicone rubber which is cut and bonded at its end to form an oval.

As shown in FIG. 2, the gasket 31 has a lower annular groove 33 formed about the outer periphery thereof which is adapted to receive the peripheral edge of the annular rim 27 for connection therewith. The gasket 31 also has an upper annular groove 35 formed about the inner periphery thereof which is adapted to receive the peripheral edge of a metering plate 37 for connection therewith. The metering plate 37 includes a plurality of metering ports 39 for controlling the amount of air to be drawn through the instrument. An important advantage of the metering plate 37 is that it can be detachably removed from the gasket 31 in order to insert other metering plates having a different number of ports in a different arrangement depending on the cooling requirements.

As shown in FIG. 2, the top portion of the gasket 31 extends above the supporting surface of the bottom section 11 to sealingly engage the bottom surface of the instrument. A pair of annular chambers 41 is formed within the seal with the top portion of the seal 31 also having an angular groove 43 formed thereon.

Upon installing the instrument of the tray 10, the front bottom portion of the instrument is placed in the tray 10 between the side rails 13 and slide rearwardly until the rear of the instrument contacts the backplate 21 to make an electrical connection with the sockets mounted on the backplate. However, upon progressing toward the rear of the tray 10, the rear bottom portion of the instrument contacts the exposed portion of the gasket 31. When this occurs, a rearward and downward force is applied to the top portion of the gasket 31. In accordance with the present invention, this rearward and downward force causes the top portion of the gasket 31 to bend over the upper groove 35 supporting the metering plate 37 (as shown in broken lines in FIG. 2). This downward force tends to drive the peripheral edge of the metering plate 37 downwardly. However, because the metering plate 37 is dimensionally larger than annular rim 27, the frontal edge of the metering plate 37 is forced downwardly to bottom out against the peripheral edge of the annular rim 27. As a result, the portion of the gasket 31 between these two elements is locked into position in such a manner that the greater the applied force by the instrument, the greater the metering plate 37 applies a holding force on the gasket 31. The top groove 43 bends the top of the gasket 31 in such a manner as to maintain it at a constant level as the instrument travels over it.

If it is desired to interchange the metering plate 37, the plate 37 can be easily snapped out of the annular groove 35 by forcing the plate upwardly. Afterwhich a new metering plate having a different porting arrangement can then be easily inserted into the groove 35. The reason for this is that there are many varied requirements for cooling various types of electronic equipment. The total amount of cooling through each plate would depend on the total area of the metering ports. Moreover, it is often important to localize the cooling to certain areas of the equipment such as either the front or side portion. Therefore, not only is the port size important, but port location is equally critical.

An important advantage of the present invention is that the gasket 31 need not be glued to the tray but can be easily inserted and detached therefrom without the use of a tool. Moreover, improved gasket construction permits temporary deflection and increased bending without degradation of the sealing force against the instrument bottom.

A further advantage of the present invention is that only the metering plate need be changed when a new piece of equipment is utilized. Prior to the present invention, the entire tray had to be substituted in such instances.

As can be seen, an avionic tray is provided having novel sealing and porting means which is easy to operate and much more dependable in operation.

It should be noted that various modifications can be made to the apparatus while still remaining within the purview of the following claims. For example, it may be desired to enlarge the side rails 13 to permit the cooling aperture to extend therethrough instead of through the bottom section 11. In this modification, an air plenum chamber would extend upwardly adjacent the side rail to communicate with the aperture.

What is claimed is:

1. In an avionic apparatus for supporting an electronic instrument chassis adjacent an air plenum chamber and providing a predetermined air metering opening between the chassis and the plenum chamber to control the volume of cooling air directed through the instrument chassis, the combination which comprises:

a tray adapted to position the instrument chassis adjacent the plenum chamber, the tray having a front end, a substantially flat bottom surface, a back portion having means spaced rearwardly from the front end of the tray and extending in one direction outwardly from the bottom surface thereof for limiting rearward movement of the chassis and guide means for guiding rearward movement of the chassis, the bottom surface of the tray defining an opening formed by a rim;

a detachable metering plate having an outer peripheral rim and defining a predetermined air metering opening of smaller size than the opening in the tray for controlling flow of air therethrough; and flexible gasket means extending between the rims of the tray and metering plate for releasably securing the metering plate to the tray so that the metering plate is sealed to the tray opening to channel air flow from the chassis through the air metering opening, the gasket means defining an annular sealing surface extending in said one direction from the bottom surface of the tray to sealingly engage the instrument chassis.

2. The combination as defined in claim 1 wherein the guide means comprises a side rail extending in said one direction on each side of the bottom surface.

3. The combination as defined in claim 2 wherein the back portion comprises a backplate extending perpendicularly to the bottom surface of the tray.

4. The combination as defined in claim 1 wherein the gasket means comprises a flexible annular gasket defining at least one annular rim receiving portion for receiving one of said tray and plate rims, the flexible gasket extending beyond the rim receiving portion on each side thereof so that the gasket is deformed when said one rim is inserted or removed from the gasket.

5. The combination as defined in claim 4 wherein the opening in the tray is formed in a pocket which extends below the bottom surface of the tray and the metering plate is positioned between the opening and the bottom surface of the tray, the metering plate having a larger outer periphery than the inner periphery of the tray rim.

6. The combination as defined in claim 5 wherein the gasket defines a second rim receiving portion for receiving the other of said tray and plate rims, the flexible gasket extending beyond said second rim receiving portion on each side thereof so that the gasket is deformed when said other rim is inserted or removed from the gasket.

7. The combination as defined in claim 6 wherein each annular rim receiving portion of the gasket is in the form of an annular groove.

8. In an avionic apparatus for supporting an electronic instrument chassis adjacent an air plenum chamber and controlling the volume of cooling air flowing between the instrument chassis and the plenum chamber, the combination which comprises:

a tray adapted to position the instrument chassis adjacent the plenum chamber, the tray having a front end, a substantially flat bottom surface, a back portion having means spaced rearwardly from the front end of the tray and extending in one direction outwardly from the bottom surface thereof for limiting rearward movement of the chassis and at least one side rail extending in said one direction from the bottom surface for guiding rearward movement of the chassis, the bottom surface of the tray defining an opening formed by a rim;

a detachable metering plate having an outer peripheral rim for controlling flow of air between the plenum chamber and the chassis; and flexible gasket means extending between the rims of the tray and metering plate for releasably securing the metering plate to the tray so that the metering plate is sealed to the tray opening, the gasket means defining an annular sealing surface extending in said one direction from the bottom surface of the tray to sealingly engage the instrument chassis.

9. The combination as defined in claim 8 wherein the tray includes a back portion in the form of a backplate extending perpendicularly to the bottom surface of the tray and a pair of side rails, each side rail extending on an opposite side of the tray perpendicularly to the bottom surface and back plate.

10. In an avionic tray for supporting the chassis of an instrument, the tray having a bottom supporting surface with an apertured rim formed in the tray in a pocket extending below the bottom surface thereof, the improvement comprising:

a detachable metering plate having an outer peripheral edge, said metering plate extending over the apertured rim of the tray and decreasing the opening of the aperture in the avionic tray, the metering plate being dimensioned such that the outer periphery thereof extends beyond the inner periphery of the apertured rim and gasket means defining an upper surface extending above the bottom surface of the tray for sealingly engaging the bottom surface of the instrument chassis, the gasket means extending between said plate's peripheral edge and said apertured tray rim for detachably mounting said metering plate over the apertured rim of the tray, the gasket means further includes an annular member having an outer groove receiving the apertured rim of said tray and an inner groove receiving the outer peripheral edge of said metering plate.

11. The invention of claim 10 wherein said annular member is made of a flexible material.

12. The invention of claim 10 wherein said plate further comprises at least one metering port extending therethrough.

13. The invention of claim 10 wherein said upper surface of said gasket means further comprises a V-shaped groove formed thereon.

14. The invention of claim 13 wherein said upper surface further comprises a hollow annular chamber formed therein.

* * * * *